United States Patent
Nie et al.

(10) Patent No.: US 8,428,127 B2
(45) Date of Patent: *Apr. 23, 2013

(54) METHOD OF PERFORMING RATE CONTROL FOR A COMPRESSION SYSTEM

(75) Inventors: Xiaochun Nie, Cupertino, CA (US); Thomas Pun, Sunnyvale, CA (US); Roger Kumar, San Francisco, CA (US); Hsi-Jung Wu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1272 days.

This patent is subject to a terminal disclaimer.

(21) Appl. No.: 12/165,625

(22) Filed: Jun. 30, 2008

(65) Prior Publication Data

US 2009/0010325 A1    Jan. 8, 2009

Related U.S. Application Data

(63) Continuation of application No. 10/427,669, filed on Apr. 30, 2003, now Pat. No. 7,418,037.

(60) Provisional application No. 60/395,972, filed on Jul. 15, 2002.

(51) Int. Cl.
*H04N 7/12*    (2006.01)

(52) U.S. Cl.
USPC .................................................. 375/240.12

(58) Field of Classification Search .......... None
See application file for complete search history.

(56) References Cited

U.S. PATENT DOCUMENTS

| | | |
|---|---|---|
| 5,038,209 A | 8/1991 | Hang |
| 5,164,828 A | 11/1992 | Tahara et al. |
| 5,231,484 A | 7/1993 | Gonzales et al. |
| 5,241,383 A | 8/1993 | Chen et al. |
| 5,333,012 A | 7/1994 | Singhal et al. |
| 5,469,208 A | 11/1995 | Dea |
| 5,623,308 A | 4/1997 | Civanlar et al. |
| 5,650,860 A | 7/1997 | Uz |
| 5,654,760 A | 8/1997 | Ohtsuki |
| 5,677,969 A | 10/1997 | Auyeung et al. |
| 5,682,204 A | 10/1997 | Uz et al. |
| 5,726,711 A | 3/1998 | Boyce |
| 5,790,196 A | 8/1998 | Sun et al. |

(Continued)

FOREIGN PATENT DOCUMENTS

| | | |
|---|---|---|
| EP | 1091588 | 4/2001 |
| WO | WO 02/096120 | 11/2002 |

OTHER PUBLICATIONS

Supplemental Notice of Allowance of U.S. Appl. No. 10/427,669, Jan. 22, 2008 (mailing date), Xiaochun Nie, et al.

(Continued)

*Primary Examiner* — Mehrdad Dastouri
*Assistant Examiner* — James Anderson, II
(74) *Attorney, Agent, or Firm* — Adeli & Tollen LLP

(57) ABSTRACT

A rate controller for allocating a bit budget for video frames to be encoded is disclosed. The rate controller of the present invention considers many different factors when determining the frame bit budget including: desired video quality, target bit rate, frame type (intra-frame or inter-frame), frame duration, intra-frame frequency, frame complexity, intra-block frequency within an intra-frame, buffer overflow, buffer underflow, and the encoded video frame quality for a possible second pass.

18 Claims, 7 Drawing Sheets

U.S. PATENT DOCUMENTS

| | | | |
|---|---|---|---|
| 5,801,779 | A | 9/1998 | Uz et al. |
| 5,872,598 | A | 2/1999 | Legall et al. |
| 5,929,914 | A | 7/1999 | Normand |
| 5,929,916 | A | 7/1999 | Legall et al. |
| 5,937,138 | A | 8/1999 | Fukuda et al. |
| 5,986,712 | A | 11/1999 | Peterson et al. |
| 5,990,958 | A | 11/1999 | Bheda et al. |
| 6,014,181 | A | 1/2000 | Sun |
| 6,023,296 | A | 2/2000 | Lee et al. |
| 6,125,147 | A | 9/2000 | Florencio et al. |
| 6,141,448 | A | 10/2000 | Khansari et al. |
| 6,160,846 | A | 12/2000 | Chiang et al. |
| 6,167,085 | A | 12/2000 | Saunders et al. |
| 6,185,253 | B1 * | 2/2001 | Pauls ............... 375/240.02 |
| 6,198,878 | B1 | 3/2001 | Blawat et al. |
| 6,212,233 | B1 | 4/2001 | Alexandre et al. |
| 6,226,326 | B1 | 5/2001 | Mihara |
| 6,229,849 | B1 | 5/2001 | Mihara |
| 6,263,020 | B1 | 7/2001 | Gardos et al. |
| 6,310,915 | B1 * | 10/2001 | Wells et al. ............... 375/240.03 |
| 6,324,217 | B1 | 11/2001 | Gordon |
| 6,347,117 | B1 | 2/2002 | Kato et al. |
| 6,480,539 | B1 | 11/2002 | Ramaswamy |
| 6,510,176 | B1 | 1/2003 | Fukuda et al. |
| 6,535,251 | B1 | 3/2003 | Ribas-Corbera |
| 6,587,506 | B1 | 7/2003 | Noridomi et al. |
| 6,639,942 | B1 | 10/2003 | Bayazit |
| 6,694,060 | B2 * | 2/2004 | Liu et al. ............... 382/236 |
| 6,763,067 | B2 | 7/2004 | Hurst |
| 6,831,947 | B2 | 12/2004 | Ribas Corbera |
| 6,847,656 | B1 | 1/2005 | Wu et al. |
| 6,944,221 | B1 | 9/2005 | Keesman |
| 6,961,376 | B2 | 11/2005 | Wu et al. |
| 6,963,608 | B1 | 11/2005 | Wu |
| 7,079,581 | B2 | 7/2006 | Noh et al. |
| 7,103,099 | B1 | 9/2006 | Paz et al. |
| 7,277,595 | B1 | 10/2007 | Reid |
| 7,418,037 | B1 | 8/2008 | Nie et al. |
| 7,804,897 | B1 | 9/2010 | Pun et al. |
| 7,940,843 | B1 | 5/2011 | Nie et al. |
| 2001/0000704 | A1 | 5/2001 | Fert et al. |
| 2002/0001344 | A1 | 1/2002 | Morris et al. |
| 2002/0012395 | A1 | 1/2002 | Song et al. |
| 2002/0034246 | A1 | 3/2002 | Yamada et al. |
| 2002/0067768 | A1 | 6/2002 | Hurst |
| 2002/0085636 | A1 | 7/2002 | Uenoyama et al. |
| 2002/0094082 | A1 | 7/2002 | Jones et al. |
| 2002/0163964 | A1 | 11/2002 | Nichols |
| 2003/0142751 | A1 | 7/2003 | Hannuksela |
| 2005/0286631 | A1 | 12/2005 | Wu et al. |
| 2006/0013298 | A1 | 1/2006 | Tong et al. |
| 2011/0243218 | A1 | 10/2011 | Nie et al. |

OTHER PUBLICATIONS

Non-Final Office Action of U.S. Appl. No. 10/716,316, Apr. 3, 2007 (mailing date), Xiaochun Nie, et al.
Final Office Action of U.S. Appl. No. 10/716,316, Jan. 11, 2008 (mailing date), Xiaochun Nie, et al.
Non-Final Office Action of U.S. Appl. No. 10/716,316, Sep. 12, 2008 (mailing date), Xiaochun Nie, et al.
U.S. Appl. No. 10/427,843, Apr. 30, 2003, Thomas Pun, et al.
U.S. Appl. No. 10/716,265, Nov. 17, 2003, Thomas Pun, et al.
U.S. Appl. No. 10/716,316, Nov. 17, 2003, Xiaochun Nie, et al.
Non-Final Office Action of U.S. Appl. No. 10/427,669, Mar. 20, 2006 (mailing date), Xiaochun Nie, et al.
Final Office Action of U.S. Appl. No. 10/427,669, Oct. 12, 2006 (mailing date), Xiaochun Nie, et al.
Non-Final Office Action of U.S. Appl. No. 10/427,669, May 4, 2007 (mailing date), Xiaochun Nie, et al.
Notice of Allowance of U.S. Appl. No. 10/427,669, Nov. 27, 2007 (mailing date), Xiaochun Nie, et al.
Notice of Allowance of U.S. Appl. No. 10/427,669, Mar. 17, 2008 (mailing date), Xiaochun Nie, et al.
Supplemental Notice of Allowance of U.S. Appl. No. 10/427,669, Mar. 17, 2008 (mailing date), Xiaochun Nie, et al.
Restriction Requirement of U.S. Appl. No. 10/427,843, Oct. 31, 2006 (mailing date), Thomas Pun, et al.
Non-Final Office Action of U.S. Appl. No. 10/427,843, Feb. 27, 2007 (mailing date), Thomas Pun, et al.
Final Office Action of U.S. Appl. No. 10/427,843, Sep. 25, 2008 (mailing date), Thomas Pun, et al.
Non-Final Office Action of U.S. Appl. No. 10/716,316, Apr. 03, 2007 (mailing date), Xiaochun Nie, et al.
Non-Final Office Action of U.S. Appl. No. 10/716,265, Mar. 28, 2007 (mailing date), Thomas Pun, et al.
Final Office Action of U.S. Appl. No. 10/716,265, Oct. 12, 2007 (mailing date), Thomas Pun, et al.
Chow, K.W. and Liu, B. "Complexity based rate control for MPEG encoder". Proceedings of the 1994 IEEE International Conference on Image Processing (ICIP-94), Nov. 1994, vol. 1, pp. 263-267.
Lee, L. W. et al. "On the Error Distribution and Scene Change for the Bit Rate Control of MPEG". IEEE Transactions on Consumer Electronics, vol. 39, Issue 3 (Jun. 11, 1993), pp. 545-554.
Teixeira, L. and Ribeiro, H. "Analysis of a Two STEP MPEG Video System". Proceedings of the 1997 IEEE International Conference on Image Processing, Oct. 1997, vol. 1, pp. 350-352.
IEEE 100: The Authoritative Dictionary of IEEE Standards Terms, $7^{th}$ ed. New York: IEEE, Dec. 2000.
Updated portions of prosecution history of U.S. Appl. No. 10/427,669, Jun. 10, 2008, Nie, Xiaochun, et al.
Updated portions of prosecution history of U.S. Appl. No. 10/716,316, Mar. 31, 2001, Nie, Xiaochun, et al.
Portions of prosecution history of U.S. Appl. No. 13/078,922, Jun. 14, 2011, Nie, Xiaochun, et al.
Updated portions of prosecution history of U.S. Appl. No. 10/716,265, Aug. 24, 2010, Pun, Thomas, et al.
Author Unknown, "Rate Control and Quantization Control," The Motion Picture Experts Group, MPEG-2 Test Model 5: Chapter 10, Mar. 1993, 7 pages.
Lee, Hung-Ju, et al., "Scalable Rate Control for MPEG-4 Video," IEEE Transactions on Circuits and Systems for Video Technology, Sep. 2000, pp. 878-894, vol. 10, No. 6, IEEE.
Westerink, P.H., et al., "Two-pass MPEG-2 Variable-Bit-Rate Encoding," IBM J. Res. Develop. Jul. 1999, pp. 471-488, vol. 43, No. 4, International Business Machines Corporation, Armonk, New York, USA.

* cited by examiner

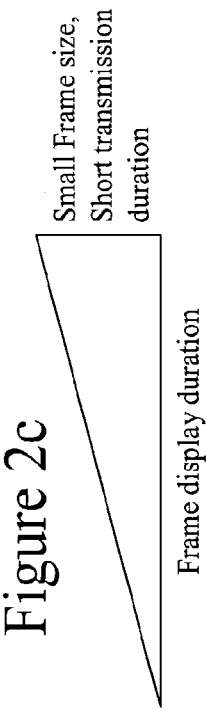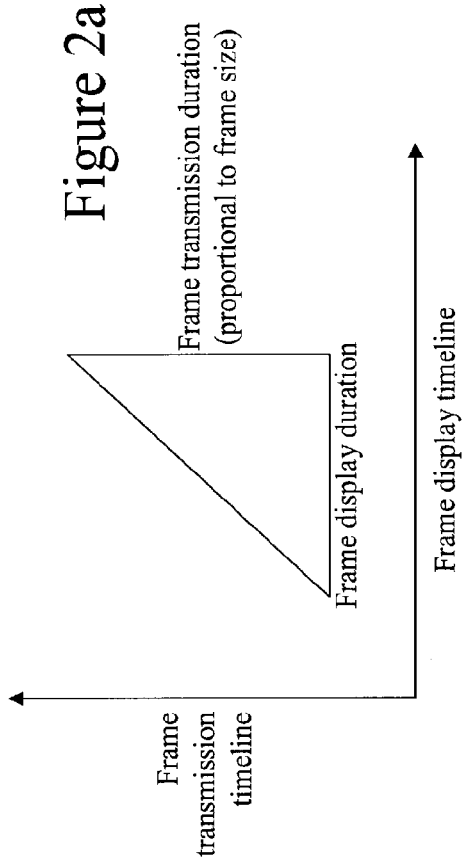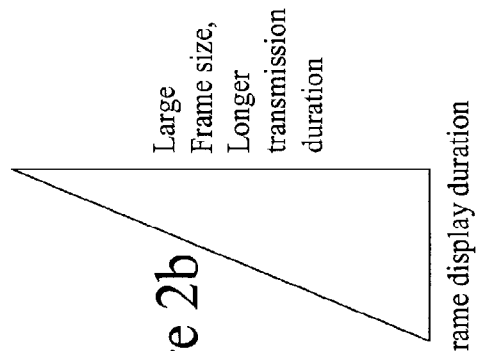

METHOD OF PERFORMING RATE CONTROL FOR A COMPRESSION SYSTEM

CLAIM OF BENEFIT TO PRIOR APPLICATIONS

This application is a Continuation of the earlier filed U.S. Non-Provisional patent application having Ser. No. 10/427,669, entitled "Method of Performing Rate Control for a Compression System," that was filed on Apr. 30, 2003 now U.S. Pat. No. 7,418,037. The patent application Ser. No. 10/427,669 claims the benefit under title 35, United States Code, Section 119(e) of the U.S. provisional application having Ser. No. 60/395,972, entitled "Method of Performing Rate Control for a Compression System," that was filed on Jul. 15, 2002.

FIELD OF THE INVENTION

The present invention relates to the field of multi-media compression and encoding systems. In particular the present invention discloses methods and systems for implementing a rate controller that efficiently allocates an available bit budget for multimedia streams to be compressed.

BACKGROUND OF THE INVENTION

Digital based electronic media formats are finally on the cusp of largely replacing all of the older analog electronic media formats. In the audio media arena, digital compact discs (CDs) replaced analog vinyl records long ago. Analog magnetic cassette tapes are becoming increasingly rare and will eventually share the same fate of 8-track tapes. Second and third generation digital audio systems such as digital Mini-discs and MP3 (MPEG Audio-layer 3) files are now taking market share away from the first generation digital audio format of compact discs.

The video media has been slower to move from analog storage and transmission formats to digital storage and transmission formats than audio. The reason for this slower analog to digital transition is largely due to the massive amounts of digital information required to accurately represent video images in digital form. The massive amounts of information require very high-capacity digital storage systems with high bit-rate outputs and high-bandwidth transmission systems. Furthermore, cost of switching from analog video equipment to digital video equipment is significantly higher than the cost of switching from analog audio equipment to digital audio equipment.

However, video is now finally rapidly moving from analog storage (VHS and Beta) and analog transmission formats (NTSC and PAL) to digital storage (MPEG) and digital transmission formats (ATSC). The DVD (Digital Versatile Disc), a digital video system, has been one of the fastest selling consumer electronic products in years. DVDs have been rapidly supplanting VHS and Beta Video-Cassette Recorders (VCRs) as the pre-recorded video playback system of choice due their high video quality, very high audio quality, convenience, and extra features. A new generation of intelligent Personal Video Records (PVRs) such as TiVo and Replay have emerged that take advantage of digital video technology. The antiquated analog NTSC (National Television Standards Committee) video transmission system is now being replaced with the digital ATSC (Advanced Television Standards Committee) video transmission system that provides for 5.1 channels of CD-quality digital audio and beautiful high-definition television (HDTV) images.

Computer systems have been using various different digital video storage and transmission formats for a number of years. Among the best digital video compression and encoding systems used by computer systems have been the series of digital video encoding systems backed by the Motion Pictures Expert Group, better known as MPEG. The three most well known and widely used digital video encoding systems from MPEG are known simply as MPEG-1, MPEG-2, and MPEG-4. The MPEG-1 format was used by VideoCDs. The MPEG-2 digital video compression and encoding system is used by DVDs and the ATSC digital television system.

The MPEG-2 and MPEG-4 standards compress a series of video frames (or fields) and encode the compressed frames (or fields) into a digital stream. The video frames may be compressed as Intra-frames or Inter-frames. An Intra-frame independently defines a complete video frame without any reference to any other information. An Inter-frame defines a video frame with reference to other video frames such as previous video frames or video frames subsequent to the current video frame.

When compressing video frames, an MPEG-2 and MPEG-4 encoder usually implements a 'rate controller' that is used to allocate a 'bit budget' for each video frame that will be compressed and encoded. Specifically, the bit budget specifies the number of bits that have been allocated to encode the video frame. By efficiently allocating a bit budget to each video frame, the rate controller attempts to generate the highest quality compressed video stream without overflowing buffers (sending more video frame information than can be stored in the target device's buffers) or underflowing buffers (not sending frames fast enough such that the decoder runs out of video frames to display). Thus, to efficiently compress and encode a digital video stream, a digital video encoder should have a rate controller that makes very wise decisions on how to allocate the available bandwidth. The present invention introduces several different methods and systems for implementing a rate controller for a digital video encoder.

SUMMARY OF THE INVENTION

A rate controller for allocating a bit budget for video frames to be encoded is disclosed. The rate controller of the present invention considers many different factors when determining the frame bit budget including: desired video quality, target bit rate, frame type (intra-frame or inter-frame), frame duration, intra-frame frequency, frame complexity, intra-block frequency within an intra-frame, buffer overflow, buffer underflow, and the encoded video frame quality for a possible second pass.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art, in view of the following detailed description in which:

FIG. 2a illustrates a temporal conceptual diagram of a video frame.

FIG. 2b illustrates a temporal conceptual diagram of a video frame that takes longer to transmit than it will be displayed.

FIG. 2c illustrates a highly compressed video frame that is transmitted much faster than.

DETAILED DESCRIPTION OF THE PREFERRED EMBODIMENT

A method and system for performing rate control in a multi-media compression and encoding system is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the MPEG-4 multimedia compression and encoding system. However, the same techniques can easily be applied to other types of compression and encoding systems that include a rate controller type of function for allocating bandwidth.

Multimedia Compression and Encoding Overview

Figure 1:
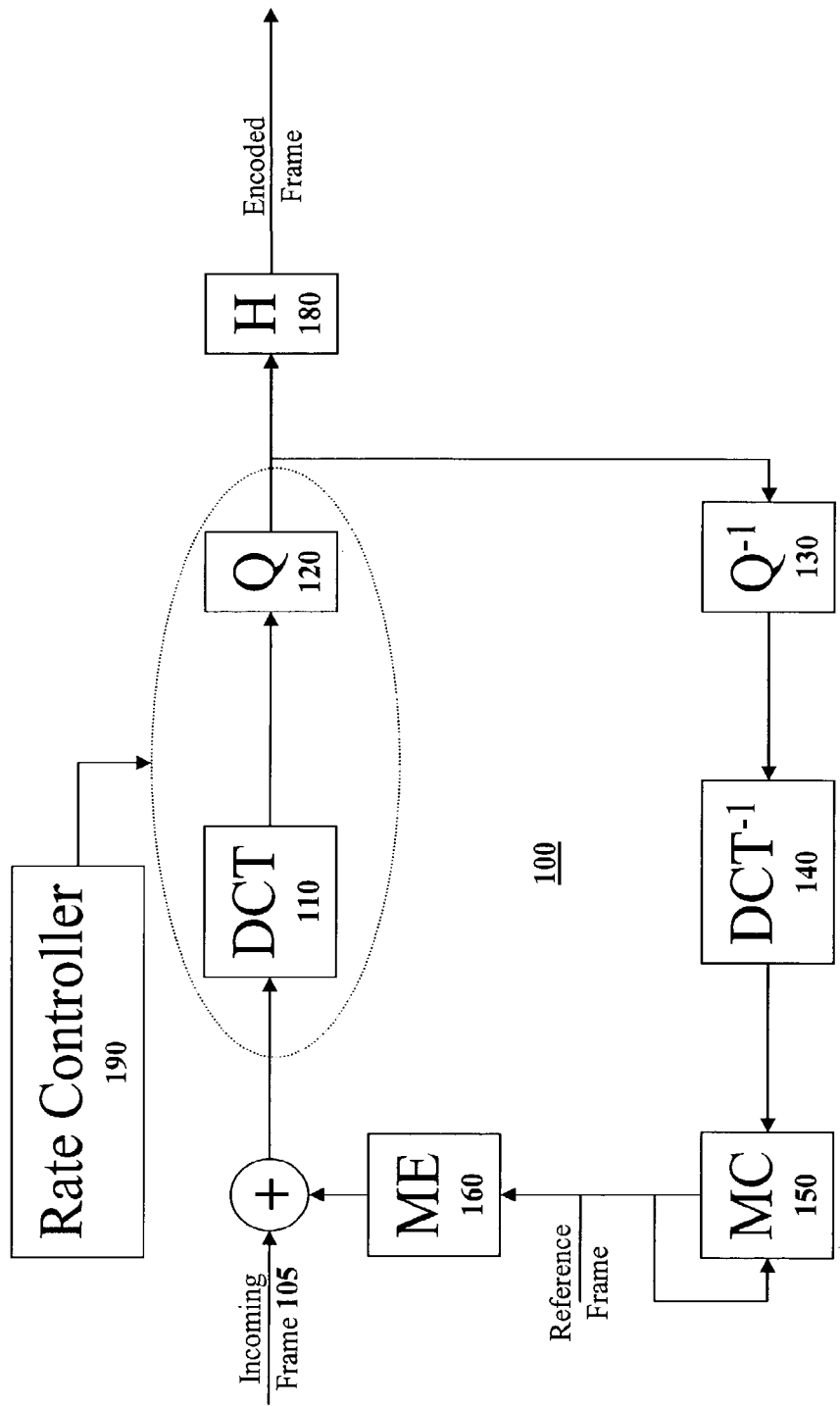
FIG. 1 illustrates a block diagram of a digital video encoder.

FIG. 1 illustrates a high-level block diagram of a typical digital video encoder 100 as is well known in the art of digital video. The digital video encoder 100 receives incoming stream of video frames 105 at the left of the block diagram. Each incoming video frame is processed by a Discrete Cosine Transformation (DCT) unit 110. The frame may be processed independently (an intra-frame) or with reference to information from other frames received from the motion compensation unit 150 (an inter-frame).

Next, a Quantizer (Q) unit 120 quantizes the digital video information from the Discrete Cosine Transformation unit 110. Finally, the quantized frame information is then encoded with an entropy encoder (H) unit 180 to produce a final encoded bit stream.

Since an inter-frame encoded video frame is defined with reference to other nearby video frames, the digital video encoder 100 needs to create a copy of how each digital video frame will appear within a digital video decoder such that inter-frames may be encoded. Thus the lower portion of the digital video encoder 100 is essentially the same as a digital video decoder unit. Specifically, an Inverse quantizer ($Q^{-1}$) 130 first reverses the quantization of the frame information. Next, an inverse Discrete Cosine Transformation ($DCT^{-1}$) unit 140 reverses the Discrete Cosine Transformation of the frame information. After all the DCT coefficients are reconstructed from iDCT, the motion compensation unit will use the information, along with the motion vectors, to reconstruct the video frame. The reconstructed video frame may then be used as a reference frame for the motion estimation of other video frames.

The reconstructed video frame may then be used to encode inter-frames that are defined relative to information in the reconstructed video frame. Specifically, a motion compensation (MC) unit 150 and a motion estimation (ME) unit 160 are used to determine motion vectors and generate differential values used to encode inter-frames based upon the reconstructed video frame.

A rate controller 190 in a digital video encoder 100 receives information from many different components of the digital video encoder 100. The rate controller 190 uses the information to allocate a bit budget for each video frame to be encoded. The bit budget should be allocated in a manner that will generate the highest quality digital video bit stream that complies with a specified set of restrictions. Specifically, the rate controller 190 attempts to generate the highest quality compressed video stream without overflowing buffers of a digital video decoding unit (exceeding the amount of available memory by sending more information than can be stored) or underflowing buffers (not sending frames fast enough such that the digital video decoding unit runs out of video frames to display).

Models Used For Rate Controller Creation

Various different models can be used to illustrate the various problems that must be handled by the rate controller in a digital video encoder such as an MPEG-4 encoder. For example, a transmission model may be used to model the timing of video frame transmissions and memory buffer occupancy. Rate distortion models are used to select a quantizer value in the Quantizer (Q) unit 120 of a digital video encoder. Various different rate distortion models may be used for inter-frame quantizer selection and intra-frame quantizer selection.

The rate transmission model simulates digital video transmission across a communication channel (such as a computer network) and buffer occupancy in the digital video decoder of the digital video player. Typically, in a computer system embodiment, the compressed video data is transmitted from a server computer and then through a network with a constant amount of bandwidth. On the client side, a digital video player has a limited memory buffer to cache digital video information received across the network from the server. The digital video player in the client system can be required to cache certain amount of digital video information before digital video player begins to play the video stream.

When digital video information is streamed from a server system across a network, the digital video player in the client system will not be able to start playing the video until at least all of the information defining the first video frame arrives. However, the digital video player should not immediately begin playing the video stream even after having received the first video frame. For example, what if the second frame takes longer time to arrive than the intended display duration of the first frame? In such a situation, the memory buffer of the digital video player lacks the needed video information to display the next video frame. This condition is referred to as 'buffer underflow' in the digital video player since the player has reached the bottom of the buffered frames available for display. To prevent this situation, there should be a minimum digital video player buffer occupancy requirement. The minimum digital video player buffer occupancy will allow the player to accommodate the fluctuation in frame sizes and network bandwidth limits.

On the other hand, a server system may send video frames at a faster rate than the video player will display the video frames such that the sent video frames exceed the physically limited amount of memory buffer space available in the client system of the digital video player. In such a case wherein the amount of the transmitted digital video frame information exceeds the available memory buffers in the digital video player, a 'buffer overflow' condition occurs. When such a buffer overflow occurs, the digital video player may have to discard the digital video frame that was being received when the memory buffer limitation was exceeded since there is no place to store the incoming information. For handheld devices with very limited amounts of memory, the memory buffer restriction is more critical than in a desktop computer system with a hard drive available as secondary memory.

To conceptually illustrate when such buffer underflow and buffer overflow conditions may occur, a video frame transmission model has been created. The transmission model conceptually illustrates the transmission and display of a sequence of video frames with reference to the available network bandwidth and digital video player's memory buffer resources.

Temporal Video Frame Transmission Model

Each digital video frame to be transmitted has two temporal properties: frame display duration and video frame transmission duration. These two temporal properties are very important to the rate controller that must allocate video frame bit budgets in a manner that obtains high quality video yet avoids the problems of memory buffer underflow and memory buffer overflow.

FIG. 2a illustrates a conceptual temporal frame model for a video frame that illustrates the frame display duration and video frame transmission duration properties. The video frame display duration, the amount of time to display this particular frame on the digital video player, is represented along the horizontal axis. The longer that the video frame must be displayed, the longer the line along the horizontal axis. The video frame transmission duration, the time it takes to transmit the compressed video frame across the communication channel (for example, from a server across a network to player), is represented along the vertical axis. The length of the video frame transmission duration vertical line is actually generated from two values: the size of a video frame (in bits) and the amount of bandwidth (in bits per second) of the communication channel. Since the size of a frame in bits is allocated by the rate controller and the bandwidth of the communication channel is known, the transmission time of a frame can be determined from the relation: Transmission time=(frame size)/(communication channel bandwidth).

As illustrated in FIG. 2a, the relation of these two properties (frame display duration and video frame transmission duration) of a frame can be illustrated as a right-angled triangle with the frame display duration along the horizontal access and the video frame transmission duration along the vertical axis. If a video frame has a frame display duration that equals the video frame transmission duration, the triangle will be an isosceles triangle with forty-five degree angles as illustrated in FIG. 2a.

If a video frame has a transmission duration that is longer than the frame display duration then the frame triangle will have an angle greater than forty-five degree in the lower left corner as illustrated in FIG. 2b. An intra-frame, a video frame that completely defines the video frame appearance independently without reference to other video frames, typically has a longer transmission time than display time as shown in the video frame representation illustrated in FIG. 2b.

If a video frame has a video frame transmission duration that is shorter than the frame display duration then the video frame triangle will have an angle less than forty-five degrees from the lower left corner as illustrated in FIG. 2c. An efficiently compressed inter-frame, a video frame that is defined with reference to information from other temporally proximate video frames, typically has a temporal frame representation as illustrated in FIG. 2c.

The Video Frame Sequence Transmission Model

A sequence of transmitted frames can be represented by linking together a series of right-angled video frame triangles of the type illustrated in FIGS. 2a to 2c. Specifically, FIG. 3A illustrates a conceptual video frame transmission model created from a sequence of right-angled triangular video frame models.

By connecting the right-angled triangular video frame models, a snaking video frame sequence transmission path is represented. The horizontal axis represents the display time of the series of video frames. The vertical axis represents the transmission time of the series of video frames. The snaking actual video frame sequence transmission path is overlaid on top of a target transmission path that is illustrated as a forty-five degree line. The target transmission path represents a transmission path wherein the high quality video bit stream is achieved by transmitting a series of video frames having a summation of transmission times equal to the summation of the display times of the video frames. Thus, the entire available communication channel bandwidth is efficiently used.

The target transmission path is not actually an ideal transmission path since the compression system will compress some frames better than others such that video frames that are easily compressed should be allocated less bits and frames that do not easily should be allocated more bits (and thus have a larger transmission time). However, an ideal transmission path should closely follow the target transmission path or else problems will occur.

Figure 3A:
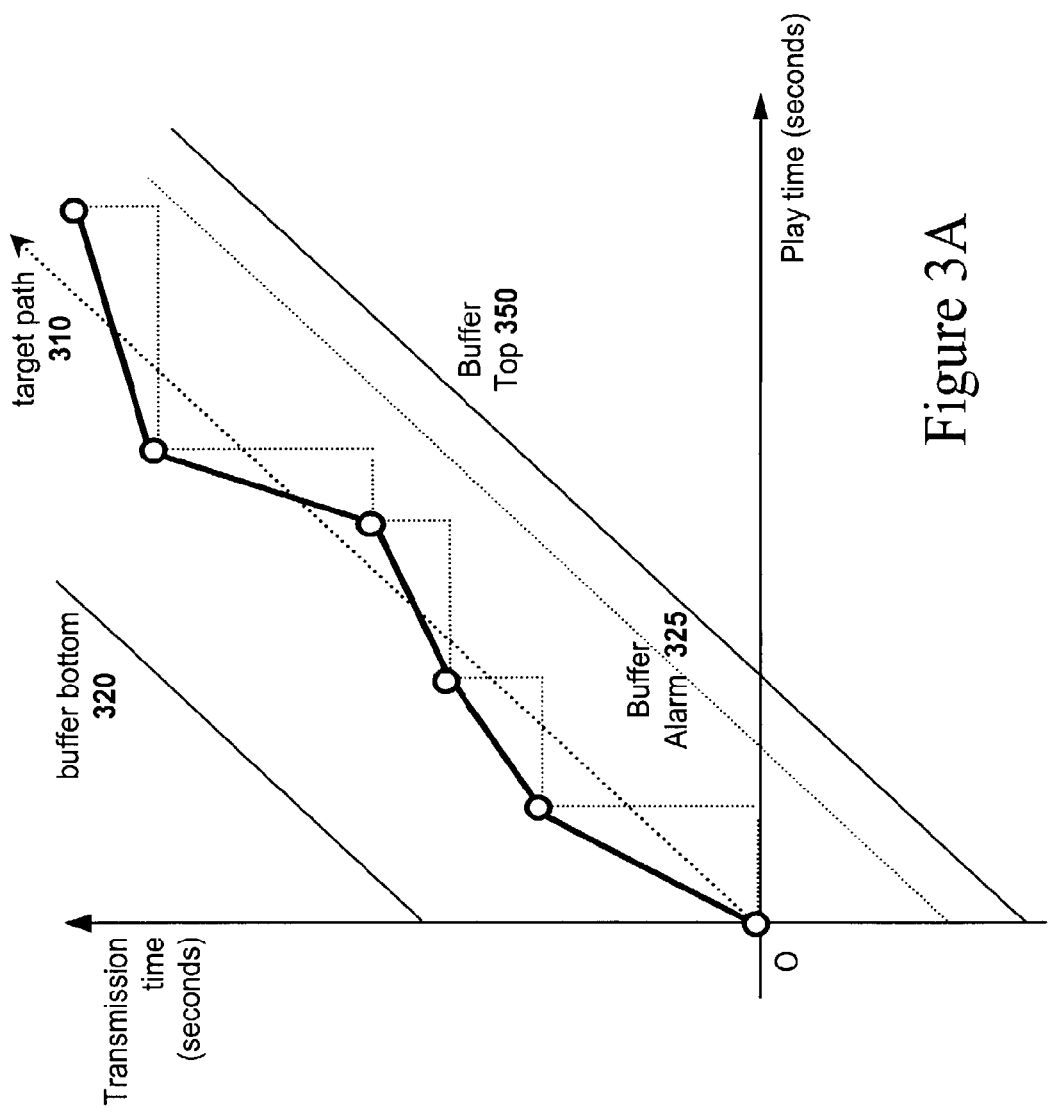
FIG. 3A illustrates a conceptual video frame transmission model created from a sequence of right-angled triangular video frame models.

The digital video player's memory buffer size limitations and minimum player buffer occupancy requirement can also be represented as proportional time quantified values on the transmission model of FIG. 3A. Thus, the player buffer size limitation and minimum player buffer occupancy requirement can be illustrated on FIG. 3A.

Buffer Underflow

The minimum player buffer occupancy can be interpreted as the digital video player's waiting time along the horizontal axis before the first frame is played in order to prevent buffer underflow. If the digital video player does not wait a needed minimum amount of time along the horizontal access then the digital video player may display all the available video frames such that the digital video player will be forced to wait for the transmission of the next video frame in the video frame sequence.

A buffer underflow can also occur if the encoder transmits too many video frames that are large in size (in terms of bytes). The underflow occurs because the small play duration of a few large video frames causes the player to quickly display and remove all the available video frames from the buffer until the player exhausts all the available video frames before receiving subsequent video frames. An example of such a buffer underflow is graphically illustrated in FIG. 3B.

To prevent this undesirable buffer underflow situation, a forty-five degree 'buffer bottom' line 320 places an upper bound on the allowed transmission path and thus limits the transmission (and thus size) of a subsequent video frame to be transmitted. By limiting the transmission path cross the buffer bottom line 320, the digital video player will not become starved for new video frames to display. A buffer alarm line 326 may be used to inform the encoder that it should allocate fewer bits to next few frames in order to prevent the undesirable buffer underflow condition.

Buffer Overflow

Figure 3B:
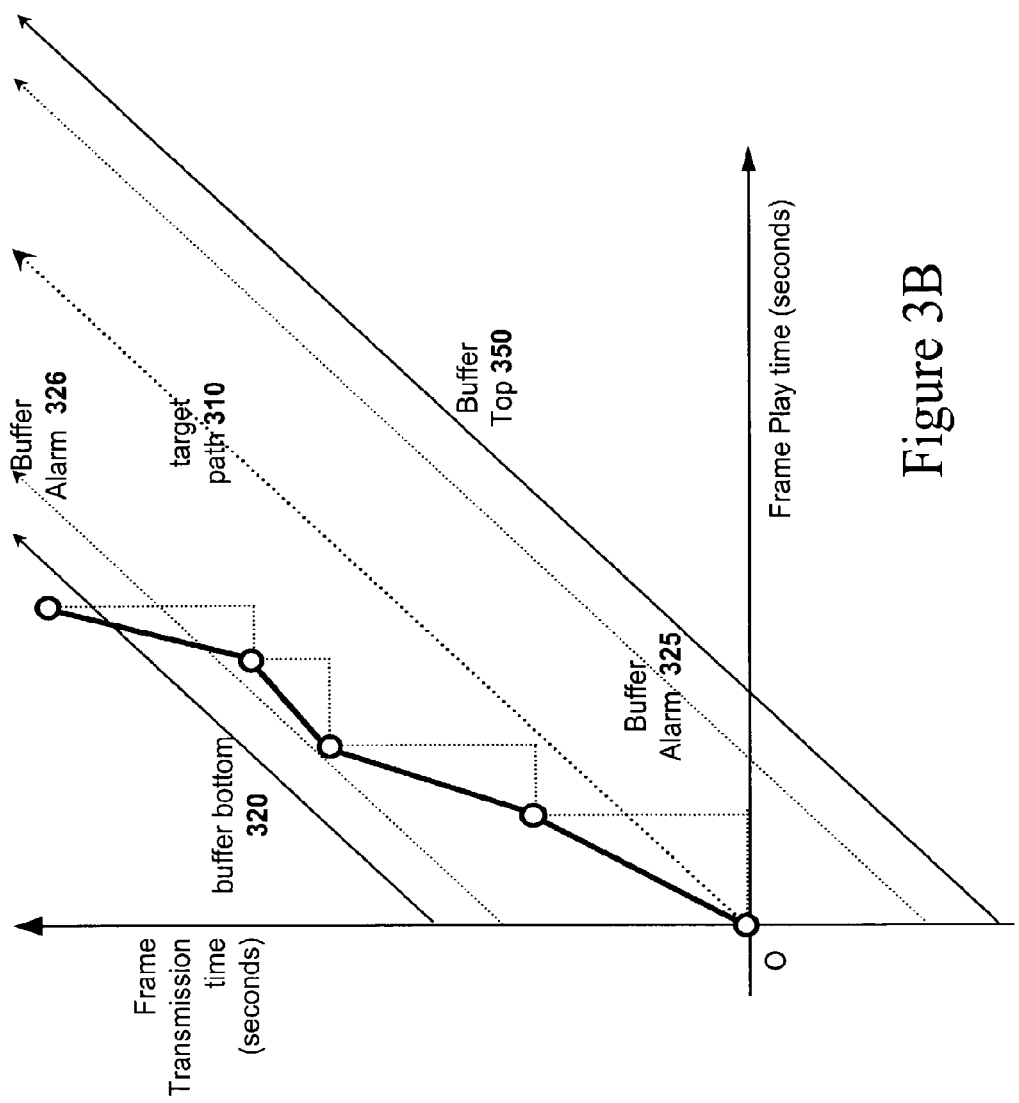
FIG. 3B illustrates the video frame transmission model of FIG. 3A wherein a buffer underflow occurs.
Figure 3C:
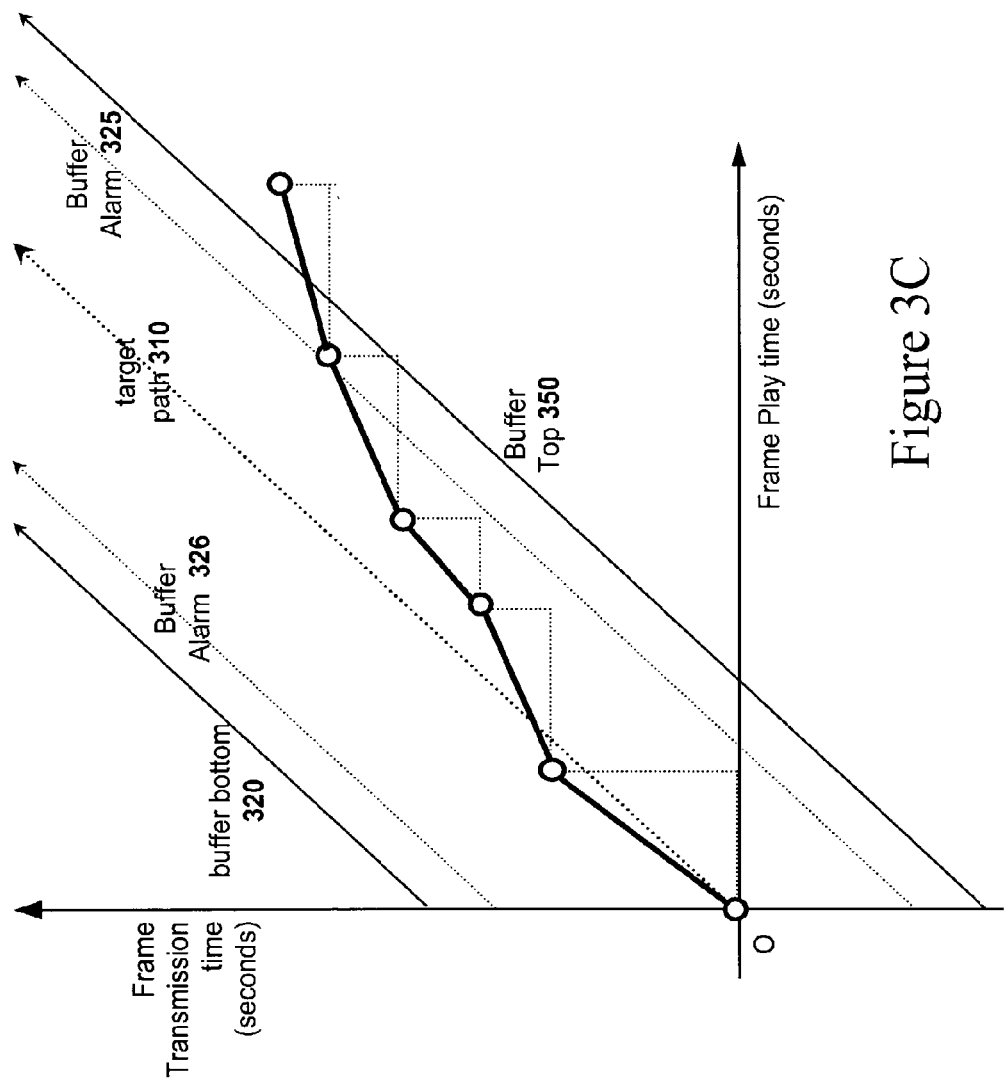
FIG. 3C illustrates the video frame transmission model of FIG. 3A wherein a buffer overflow occurs.

The digital video player's memory buffer size limitation can be interpreted as the time to fill up the player memory buffer (along the horizontal axis) if no frame information is taken out of the memory buffer. If video frames are not displayed and then subsequently removed from the digital video player's memory buffer at a fast enough rate, the limited memory buffer will overflow with frame information. Thus, a 'buffer top' line 350 limits the rate at which the digital encoder will create video frames that have short transmission times but have long display times. If the creation of frames having short transmission times but long display times is not limited, then the memory buffer in the digital video player will overflow as illustrated in FIG. 3C.

Figure 4:
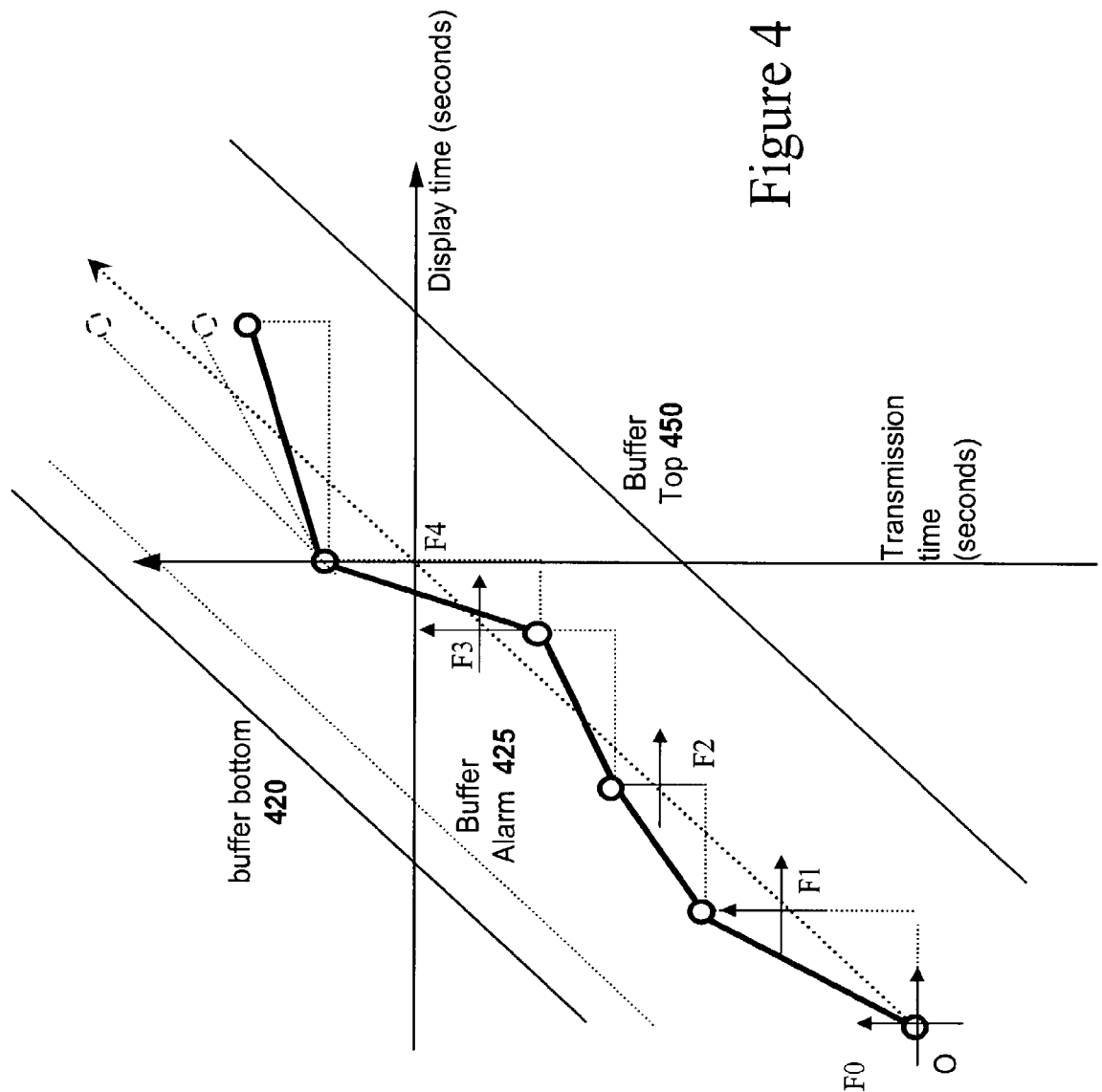
FIG. 4 illustrates the conceptual video frame transmission model of FIG. 3 with a shifting coordinate system.

Starting from the first video frame, the origin of the coordinate system coincides with the current buffer position. The horizontal axis represents the video frame display time and the vertical axis represents the video frame transmission time. After the encoder creates each new video frame, the origin of the coordinate system will be updated to a new position on the transmission model as illustrated in FIG. 4. The origin always slides to the right to the end of the previous frame's play duration and is aligned vertically on the forty-five degree angle target transmission path. Since the duration of the next video frame to be encoded is known to the digital video encoder, and the vertical axis always passes the position of the new frame, the updated coordinate system can be determined. FIG. 4 illustrates a series of video frame coordinate systems F0, F1, F2, F3 and F4 as updated coordinate systems as time progresses. For each new video frame, the goal is to find a vertical position (transmission duration which is proportional to the frame size) of the new video frame so that the position of the next node fulfills the memory buffer restrictions. Specifically, the next node must fall between the buffer top 450 and the buffer bottom 420 limit lines.

Overview of a Rate Controller That Considers Multiple Factors

Figure 5:
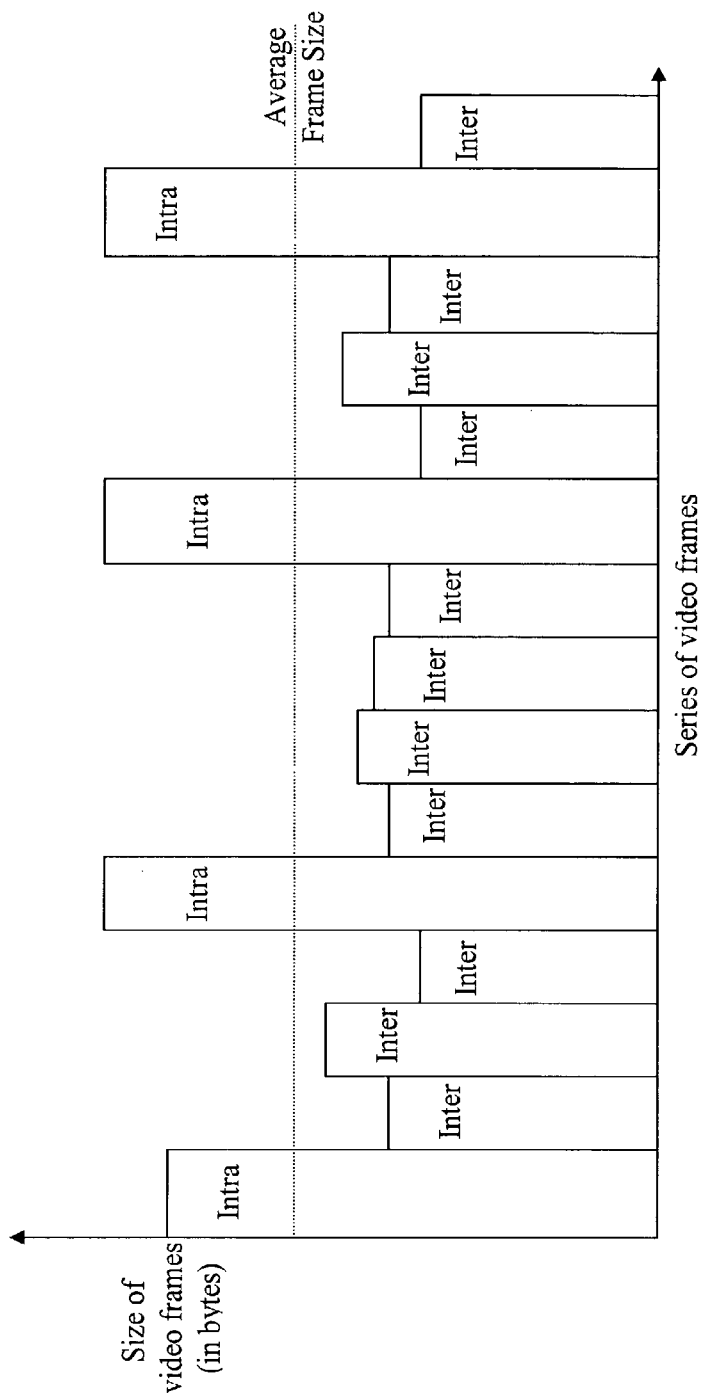
FIG. 5 illustrates a conceptual illustration of a series of encoded video frames having different sizes (in number of bytes) and an average frame size.

As previously set forth, a real transmission path will have a certain amount of deviation about the target transmission path. Normally, the compressed frame sizes vary within a certain range. For example, FIG. 5 illustrates a conceptual illustration of a series of encoded video frames having different sizes (in number of bytes) and an average frame size. Note that the Intra-frames generally use a significantly larger number of bytes than the inter-frames that obtain higher compression rations since such inter-frames reference information in other proximate video frames.

The video frame transmission model set forth in the previous section provides a very useful tool that may be used predict the memory buffer condition in a digital video player that would receive and decode the transmitted video stream. Thus, a rate controller may use the video frame transmission model to prevent memory buffer overflow or memory buffer underflow in the digital video player. Specifically, the rate controller should allocate target bit budgets for each video frame in such a manner as to achieve maximum video image quality while satisfying the memory buffer restrictions that prevent memory buffer overflow or memory buffer underflow in the digital video player.

The digital video encoder with the rate controller system of the present invention also uses the following available information when allocating a bit budget to a video frame to be encoded:

- A target bit rate in bits per second—The target bit rate is determined from the available bandwidth of the communication channel that will be used such as a computer network connection. The target bit rate may also be dictated by the bit rate offered by a particular storage medium.
- Video frame display duration of each video frame in seconds—The video frame duration is dependent upon the incoming video stream.
- The frame type of each frame, inter frame or intra frame—The type of video frame that is created will generally be determined by the motion estimation and motion compensation systems in the digital video encoder. The rate controller will use this selection to help determine the bit budget to be allocated to the video frame.
- The maximum digital video player memory buffer size (in bytes)—The maximum digital video player buffer size is either known or estimated. If the actual memory buffer size of a digital video player is smaller than the buffer size anticipated by the digital video encoder, then the digital video player will drop video frames when memory buffer overflow occurs.
- The minimum digital video player buffer occupancy in bytes—The minimum digital video player buffer occupancy is either known or estimated. If the actual buffer occupancy of a digital video player is less than the buffer occupancy anticipated by the digital video encoder, then the digital video player may play video frames for a longer than intended duration as memory buffer underflow occurs. Alternatively, the digital video player may wait idle for the next frame or drop the next frame until it gets any frames that can be played in time.

The rate controller of the present invention allocates a bit budget for each video frame based on these several different factors.

Video Quality Level

The video quality level is used to place a particular video frame into an arbitrary quality level category. The video quality level represents the number of bits per pixel per frame. Under different video quality settings, the budget of target bits for intra-frames and inter-frames can be different. Usually, the ratio of intra-frame size (in bytes) to inter-frame size (in bytes) in lower quality setting is larger than the ratio in a higher quality setting.

In one particular embodiment, four different levels of quality settings are used (High, Medium, Low, and Bad) depending on the compression settings from user:

```
enum
{
    qualityHi = 1,
    qualityMd,
    qualityLo,
    qualityBad
};
```

To select a video quality level, the rate controller first calculates the number of bits per pixel per frame using the following formula:

bitsPerPixPerFrame=bitRate/(width*height)*averageFrameDur;

Next, depending on the value of bitsPerPixPerFrame, the video quality level is determined using threshold values with the following pseudo-code:

```
if ( bitsPerPixPerFrame > kBitsPerPixPerFrameHi )
    qualityLevel = qualityHi;
else if( bitsPerPixPerFrame > kBitsPerPixPerFrameLo &&
         bitsPerPixPerFrame < kBitsPerPixPerFrameHi )
```

```
        qualityLevel = qualityMd;
    else if( bitsPerPixPerFrame > kBitsPerPixPerFrameBad &&
            bitsPerPixPerFrame < kBitsPerPixPerFrameLo )
        qualityLevel = qualityLo;
    else
        qualityLevel = qualityBad;
```

Some exceptions may affect the video quality level. In one embodiment, certain exceptions are handled with the following pseudo-code:

```
if( bitRate < 56000 && ( 1 / averageFrameDur ) > 5 &&
    pixNum > 20000 ) qualityLevel = qualityBad;
if( bitRate < 320000 && ( 1 / averageFrameDur ) > 5 &&
    pixNum > 20000 )
    if( qualityLevel == qualityHi )
        qualityLevel = qualityMd;
if( bitRate >= 1000000 && ( 1 / averageFrameDur ) <= 35 &&
    pixNum <= 4250000     )
    if( qualityLevel != qualityHi )
        qualityLevel = qualityMd;
if( bitRate >= 800000 && ( 1 / averageFrameDur ) <= 35 &&
    pixNum <= 4250000     )
    if( qualityLevel != qualityHi &&
    qualityLevel !=qualityMd )
    qualityLevel  = qualityMd;
```

Video Frame Type

As previously set forth, the MPEG-2 and MPEG-4 compression systems take advantage of the redundancy between most video frames to efficiently compress and encode digital video. These digital video systems work by having periodic Intra-frames (also known as "key frames") that completely and independently describe a video frame and more common Inter-frames that describe a video frame by referencing redundant information from other temporally proximate frames.

Since the intra-frames do not have the luxury of being able to refer to information in other temporally proximate frames, the intra-frames generally require more bytes for digital encoding. Thus, the bit budget for intra-frames must be significantly larger than the bit budget for inter-frames since intra-frames must contain much more information.

The present invention operates using a pair of distinct frame ratios: an intra-frame ratio and an inter-frame ratio. The frame ratios specify a multiple of the average frame size. Depending on the quality level (as described in a previous section), the default intra-frame and inter-frame target size can be obtained. First, the rate controller calculates the intra-frame ratio and the inter-frame ratio as follows:

```
#define kAverageIntraFrameRatioHiQ 3.8
        //in multiple of average frame size
#define kAverageIntraFrameRatioMdQ 5.0
        //in multiple of average frame size
#define kAverageIntraFrameRatioLoQ 7.3
        //in multiple of average frame size
#define kAverageIntraFrameRatioBadQ 10.0
        //in multiple of average frame size
    if( keyRate <= 1   )
    {
    intraFrameRatio = 1;
    interFrameRatio = 1;
    }
    else if( keyRate > 1 )
    {
        if( qualityLevel == qualityHi )
            intraFrameRatio = kAverageIntraFrameRatioHiQ;
        else if(qualityLevel == qualityMd)
            intraFrameRatio = kAverageIntraFrameRatioMdQ;
        else if(qualityLevel == qualityLo)
            intraFrameRatio = kAverageIntraFrameRatioLoQ;
        else
            intraFrameRatio =kAverageIntraFrameRatioBadQ;
    interFrameRatio= ( keyRate–intraFrameRatio )/
                            ( keyRate – 1 );
    if( interFrameRatio < kAverageInterFrameRatioMin )
    {
        interFrameRatio = kAverageInterFrameRatioMin;
        intraFrameRatio = kAverageInterFrameRatioMin
    + ( 1 – kAverageInterFrameRatioMin ) * keyRate;
    }
}
```

After determining the intra-frame ratio and the inter-frame ratio (relative to the average frame size) then the default intra-frame size and inter-frame size are determined. The frame size may be determined in a number of bytes (that will be used to encode the video frame) or in a transmission duration (in seconds) which is directly proportional to the frame size in bytes using the transmission rate (in bytes per second). The following code determines a transmission given the frame ratios from the preceding code:

```
if( averageFrameDur / minBuffOccupy < 0.3 )
{ //normal case
    defaultIntraDur     = averageFrameDur * intraFrameRatio;
    defaultInterDur     = averageFrameDur * interFrameRatio;
    underFlowPAlarmLevel = minBuffOccupy
        – defaultInterDur * kInterFrameSizeEstimateError
        – curDur;
    underFlowIAlarmLevel = minBuffOccupy
        – defaultIntraDur * kIntraFrameSizeEstimateError
        – curDur;
}
else
{//when frame duration is close to buffer delay size
    defaultIntraDur        = averageFrameDur * 1.0;
    defaultInterDur        = averageFrameDur * 0.5;
    underFlowPAlarmLevel = minBuffOccupency*0.9 – curDur;
    underFlowIAlarmLevel = minBuffOccupency*0.9 – curDur;
}
// Set alarm level based on frame type (Intra or inter)
if( keyFrame )    // If an intra-frame
    underFlowAlarmLevel = underFlowIAlarmLevel
else
    underFlowAlarmLevel = underFlowPAlarmLevel
```

The default intra-frame size (in bytes) and inter-frame size (in bytes) may be calculated by multiplying the transmission duration (defaultIntraDur or defaultInterDur) by the transmission rate in bytes per second. The default intra-frame size (in bytes) and inter-frame size (in bytes) is used to determine target bit budgets for intra-frames and inter-frames, respectively. However, these roughly allocated bit budgets may be modified by a number of other factors as will be shown.

Video Frame Duration

The incoming video frames may vary in the intended frame display duration. The rate controller of the present invention adapts to varying frame durations. Specifically, the rate controller updates the default target bit budgets for the intra-frames and inter-frames. Using a general heuristic, the longer the display duration of each frame, the more bits should be allocated to the bit budget for that video frame provided that the transmission rate stays within a certain target bit rate.

The average frame duration (averageFrameDur) can be calculated by doing weighted average of the duration of a new frame (newDuration) and the historical average frame duration (averageFrameDur). In one particular embodiment, the historical average is given a weight of 80% and the new frame is given a weight of 20%. Thus, the weighted average frame duration (averageFrameDur) may be calculated as follows:

```
#define kDurWeight  0.8  //Weight assigned to historical avg
avgFrameDur = avgFrameDur*kDurWeight +
                    newDuration*(1 - kDurWeight)
```

Intra-Frame Frequency

Very dynamic video sources such as explosions or video with a large number of very fast scene changes will require a larger number of intra-frames since the amount of redundancy between frames is very limited. In such situations where the video encoder requires a large number of intra-frames (also known as key frames) within a short period of time, the rate controller may run out of memory buffer space if the rate controller continues to allocate the same amount of bits to all the intra-frames. Thus, in such high intra-frame rate situations, the rate controller should reduce bit budget for key frames.

In one embodiment, where a default Intra-frame duration (defaultIntraDur) and default Inter-frame duration (defaultInterDur) are known, then a suggested Intra-frame duration (suggestedIntraDur) and a suggested Inter-frame duration (suggestedInterDur) may be calculated by taking the intra-frame frequency into account as follows:

```
keyNum = 0;
//Determine a key frame number
for( i = kKeyFrameHistoryNum; i--; )
    if( keyFrameHistory[ i - 1 ] == 1 ) keyNum++;
if( keyNum <= 0 )
    { // Use defaults if too few key frames
        curKeyRate       = keyRate;
        suggestedIntraDur = defaultIntraDur;
        suggestedInterDur = defaultInterDur;
    }
else
{
  newIntraFrameRatio = intraFrameRatio;
  curKeyRate = kKeyFrameHistoryNum / keyNum;
  if( curKeyRate > keyRate ) curKeyRate = keyRate;
  newInterFrameRatio = (curKeyRate - intraFrameRatio )
                    / ( curKeyRate - 1 );
  if(newInterFrameRatio < kAverageInterFrameRatioMin)
    {
      newInterFrameRatio = kAverageInterFrameRatioMin;
      newIntraFrameRatio = kAverageInterFrameRatioMin +
        (1 - kAverageInterFrameRatioMin ) * curKeyRate;
    }
  suggestedIntraDur=averageFrameDur * newIntraFrameRatio;
  suggestedInterDur=averageFrameDur * newInterFrameRatio;
}
```

Video Frame Complexity

The content of different video sequences can vary significantly. However, even a series of video frames within the same video sequence can vary quite significantly within that sequence. Thus, each individual inter-frame or intra-frame within the same video sequence may need a different number of bits in order to achieve the same level of visual quality.

One well-known measure of a video frame complexity is known as the mean average difference (MAD) for the video frame. The mean average difference (MAD) of a video frame is the mean of all the Sum of Absolute Differences (SAD) values for all the individual macroblocks that comprise the video frame. To prevent a large change from occurring quickly, an average MAD value may be calculated across the history of a number of video frames. The average MAD (avgMAD) can be calculated by doing weighted average of the MAD of a current frame (curMAD) and the historical average MAD (avgMAD) as follows:

```
#define kMADWeight  0.8  // Make historical MAD 80% of weight
avgMAD = avgMAD * kMADWeight + ( 1- kMADWeight ) * curMADe
```

Then, using this historical average MAD, a target bit hint (targetBitsHint) may be created. The target bit hint (targetBitsHint) represents how much deviation there is between the current frame and the average frame in terms of bits needed to encode the current frame for a specified visual quality. The target bit hint (targetBitsHint) may be calculated as follows:

targetBitsHint=(curMAD−avgMAD)/avgMAD;

Intra-Block Frequency Within An Intra-Frame

Although an intra-frame cannot refer to information in other video frames, the individual macroblocks within an intra-frame may refer to other macroblocks in the same intra-frame. Such macroblocks that refer to other macroblocks in the same frame are referred to as 'intra-blocks'. Inter-frames may also contain up to certain percentage of intra blocks. Using a general heuristic, the more intra-blocks within an intra-frame, the more bits should be allocated to that frame.

One embodiment of the rate controller of the present invention uses the percentage of intra-blocks within a video frame to adjust a target bit hint value (targetBitsHint). In one embodiment, the adjustment to the target bit hint value is performed as follows:

targetBitsHint=targetBitsHint+(intraPercentage−0.3)
       *0.3;

Current Memory Buffer Limitations

As set forth with reference to FIGS. 2, 3A, 3B and 3C, the encoder must carefully allocate bit budgets to each individual video frame in a manner that avoids memory buffer problems in the digital video player system. This is a 'hard' limit such that the rate controller should always stay within the buffer top 450 and the buffer bottom 420 lines of FIG. 4 to prevent memory buffer overflow or memory buffer underflow in the digital video player, respectively. When the rate controller detects that the memory buffer condition is getting close to the level of overflow or underflow, the rate controller should make an adjustment of the target size to compensate it.

We define a unified variable bufferAnxiety to measure the current buffer condition. The bufferAnxiety quantifies whether there is a danger of a buffer underflow or buffer overflow. If the current path is above the target path (curY>=0), then there is a buffer underflow risk (the player might hit the bottom of the memory buffer) as illustrated in FIG. 3B. If the current path is below the target path (curY<0), then there is a buffer overflow risk (the player might go over the top of the memory buffer) as illustrated in FIG. 3C.

```
// Determine the Buffer anxiety condition, 0=optimal
if( curY > = 0 ) // Determine anxiety with underflow risk
    bufferAnxiety = curY / underFlowAlarmLevel
else // Else determine the anxiety with overflow risk
    bufferAnxiety = curY
            / (maxerBufferDur - underFlowAlarmLevel)
```

Bit Budget Calculation in a Rate Controller That Considers Multiple Factors

After considering all the factors defined in the previous section, a rate controller may calculate a final bit budget for the next video frame based upon those defined factors. Note that the various different factors are generally not considered equally. For example, the buffer anxiety level defines a very important value that must be taken seriously in order to prevent a buffer overflow. On the other hand, the target bit hint value (targetBitsHint) and the selected quality level (qualityLevel) are merely used to adjust the bit budget.

In one embodiment, an initial target frame size (or transmission duration) candidate is generated with the following equation which begins with an average intra-frame size or inter-frame size depending on if the frame is an Intra-frame or an inter-frame:

dur=keyFrame?averageIntraDur:averageInterDur;

Then, the rate controller adjusts the initial frame size (dur) value to calculate a target frame duration value (targetDur). As will be described in the next section, the calculation is different if only one attempt will be made to create a bit budget (onePass=TRUE).

```
if( onePass )
{ // Set conservative target bit hit if only 1 pass
    if( qualityLevel == qualityHi )
        targetBitsHint *= 0.3;
    else if( qualityLevel == qualityMd )
        targetBitsHint *= 0.3;
    else if( qualityLevel == qualityLo )
        targetBitsHint *= 0.3;
    else targetBitsHint *= 0.3;
}
else
{ // Set aggressive target bit hint if more than 1 try
    if( qualityLevel == qualityHi )
        targetBitsHint *= 1.0;
    else if( qualityLevel == qualityMd )
        targetBitsHint *= 1.0;
    else if( qualityLevel == qualityLo )
        targetBitsHint *= 0.8;
    else targetBitsHint *= 0.3;
}
if( keyFrame )
{ //This section handles Intra-frames (AKA key frames)
    if( bufferAnxiety < 0 )
    { // Adjust for the buffer overflow risk
        if( bufferAnxiety >= -0.3 )
        { // Slightly increase frame size
            if( dur < 0.7 * defaultIntraDur )
                dur *= 1.05;
        }
        else if( bufferAnxiety >= -0.7 )
        {
            if( dur < 0.8 * defaultIntraDur )
                dur *= 1.1;
            if(onePass) averageIntraDur *= 1.1;
        }
        else if( bufferAnxiety >= -0.9 )
        {
            if( dur < defaultIntraDur )
                dur = defaultIntraDur;
            if( targetBitsHint < 0 )
                targetBitsHint = 0;
            if(onePass)
                averageIntraDur *= 1.2;
            else
                dur *= 1.3;
        }
        else
        {
            if( dur < 1.1 * defaultIntraDur )
                dur = 1.1 * defaultIntraDur;
            if( targetBitsHint < 0 )
                targetBitsHint = 0;
            if(onePass)
                averageIntraDur *= 1.2;
            else
                dur *= 1.5;
        }
    }
    else
    {// Adjust for the buffer underflow risk
        if( bufferAnxiety <= 0.3 )
        {
            dur *= 0.95;
            if( dur > 0.9 * suggestedIntraDur )
                dur *= 0.9;
        }
        else if( bufferAnxiety <= 0.5 )
        {
            dur *= 0.90;
            if( dur > 0.8 * suggestedIntraDur )
                dur *= 0.8;
            //if(onePass)
            //    averageIntraDur /= 1.1;
        }
        else if( bufferAnxiety <= 0.8 )
        {
            dur *= 0.85;
            if( dur > 0.8 * suggestedIntraDur )
                dur = 0.8 * suggestedIntraDur;
            if(onePass)
            {
                averageIntraDur   *= 0.8;
                suggestedIntraDur *= 0.8;
            }
        }
        else if( bufferAnxiety <= 0.9 )
        {
            dur *= 0.80;
            if( dur > 0.7*suggestedIntraDur )
                dur = 0.7*suggestedIntraDur;
            if( targetBitsHint > 0 )
                targetBitsHint = 0;
            if(onePass)
            {
                averageIntraDur   *= 0.6;
                suggestedIntraDur *= 0.6;
            }
        }
        else
        {
            dur *= 0.75;
            if( dur > 0.4*suggestedIntraDur )
                dur = 0.4*suggestedIntraDur;
            if( targetBitsHint > 0 )
                targetBitsHint = 0;
            if(onePass)
            {
                averageIntraDur   *= 0.4;
                suggestedIntraDur *= 0.4;
            }
        }
    }
}
else
{ //This area handles Inter-frames (AKA P- or B-frames)
    if( bufferAnxiety < 0 )
    { // Adjust for the buffer overflow risk
        if( bufferAnxiety >= -0.3 )
        {
            if( dur < 0.7 * defaultInterDur )
                dur *= 1.05;
        }
        else if( bufferAnxiety >= -0.7 )
        {
            if( dur < 0.7 * defaultInterDur )
                dur *= 1.1;
            if(onePass)
                averageInterDur *= 1.1;
        }
```

```
        else if( bufferAnxiety >= -0.9 )
        {
            if( dur < defaultInterDur )
                dur = defaultInterDur;
            if( targetBitsHint < 0 )
                targetBitsHint = 0;
            if(onePass)
                averageInterDur *= 1.2;
            else
                dur *= 1.3;
        }
        else
        {
            if( dur < 1.1 * defaultInterDur )
                dur = 1.1 * defaultInterDur;
            if( targetBitsHint < 0 )
                targetBitsHint = 0;
            if(onePass)
                averageInterDur *= 1.2;
            else
                dur *= 1.5;
        }
    }
    else
    { // Adjust for the buffer underflow risk
        if( bufferAnxiety <= 0.3 )
        {
            dur *= 0.95;
            if( dur > 0.9 * suggestedInterDur )
                dur *= 0.9;
        }
        else if( bufferAnxiety <= 0.5 )
        {
            dur *= 0.90;
            if( dur > 0.8 * suggestedInterDur )
                dur *= 0.8;
            //if(onePass)
            //    averageInterDur /= 1.1;
        }
        else if( bufferAnxiety <= 0.8 )
        {
            dur *= 0.85;
            if( dur > 0.8 * suggestedInterDur )
                dur = 0.8 * suggestedInterDur;
            if(onePass)
            {
                averageInterDur   *= 0.8;
                suggestedInterDur *= 0.8;
            }
        }
        else if( bufferAnxiety <= 0.9 )
        {
            dur *= 0.80;
            if( dur > 0.6 * suggestedInterDur )
                dur = 0.6 * suggestedInterDur;
            if( targetBitsHint > 0 )
                targetBitsHint = 0;
            if(onePass)
            {
                averageInterDur   *= 0.6;
                suggestedInterDur *= 0.6;
            }
        }
        else
        {
            dur *= 0.75;
            if( dur > 0.4 * suggestedInterDur )
                dur = 0.4 * suggestedInterDur;
            if( targetBitsHint > 0 )
                targetBitsHint = 0;
            if(onePass)
            {
                averageInterDur   *= 0.4;
                suggestedInterDur *= 0.4;
            }
        }
    }
}
scale = 1 + targetBitsHint;
if( scale < 0.3 ) scale = 0.3;
if( scale > 1.5 ) scale = 1.5;
// Determine the next origin location
nextY = curY + dur * scale;
if( nextY > curYHi ) nextY = curYHi;
if( nextY < curYLo ) nextY = curYLo;
targetDur = nextY - curY;
```

Encoded Quality Looping

After a bit budget has been allocated to a video frame and the video frame has been compressed, the rate controller may have the option to check the quality of the compressed video frame. This may occur if a very fast processing system is used in a real-time encoding application. This may also occur when the digital video encoder is not being used in a real time application. For example, if the video encoder is being used to generate a piece of media that will be duplicated, the encoder may wish to make more than one pass in order to achieve a more optimal result.

So, if the digital video encoder has the luxury of being able to check the video quality, then the digital video encoder may wish to make certain adjustments if the desired quality has not been achieved. For example, if the quality of the encoded video frame is below certain threshold quality value, then the rate controller may choose to increase the bit budget for the video frame and redo the compression in order to improve the quality of that video frame. Furthermore, the digital video encoder may wish to make more aggressive assumptions on the first pass and then adjust to more conservative levels if the aggressive assumptions do not produce an acceptable result.

The foregoing has described a system for performing rate control in a multi-media compression and encoding system. It is contemplated that changes and modifications may be made by one of ordinary skill in the art, to the materials and arrangements of elements of the present invention without departing from the scope of the invention.

We claim:

1. A method of encoding digital video content comprising a plurality of video frames into a bit stream, said method comprising:
   determining a default bit budget for a particular video frame of the plurality of video frames;
   adjusting said default bit budget to generate a target bit budget for said video frame based on a plurality of different factors comprising an average frame display duration, the average frame display duration comprising a historical average frame display duration, each factor in the plurality of factors assigned a different weight such that adjusting the default bit budget occurs disproportionately based on the different weights assigned to each of the different factors; and
   encoding the particular video frame using the target bit budget.

2. The method of claim 1, wherein adjusting the default bit budget to generate the target bit budget is further based on a memory buffer condition of a decoding unit for decoding the encoded digital video content.

3. The method of claim 1, wherein adjusting the default bit budget to generate the target bit budget is further based on a bandwidth limitation for transmitting the encoded bit stream to a decoding unit for decoding the encoded digital video content.

4. The method of claim 1, wherein determining the default bit budget comprises determining the default bit budget based on a selected video image quality level and an averaging of an encoding factor over said plurality of video frames.

5. A method of encoding a set of frames of a video content into an encoded bit stream, said method comprising:
- identifying a first default bit budget for encoding a first intra-frame type video frame of the plurality of video frames;
- encoding the first video frame using a modified first default bit budget that is modified based on an average frame display duration comprising a historical average frame display duration of a plurality of frames, a plurality of factors related to the first video frame, and an available bandwidth for transmission of the bit stream, each factor in the plurality of factors related to the first video frame assigned a different weight such that adjusting the bit budget occurs disproportionately based on the different weights assigned to each of the factors;
- identifying a second default bit budget for encoding a second intra-frame type video frame of the plurality of video frames, wherein the first and second default bit budgets are different; and
- encoding the second video frame using a modified second default bit budget that is modified based on an average frame display duration comprising a historical average frame display duration of a plurality of frames, a plurality of factors related to the second video frame, and the available bandwidth for transmission of the bit stream, each factor in the plurality of factors related to the second video frame assigned a different weight such that adjusting the bit budget occurs disproportionately based on the different weights assigned to each of the factors.

6. The method of claim 5, wherein the first and second default bit budgets are further determined from a selected quality level of encoding.

7. The method of claim 5, wherein factors related to the transmission of the bit stream comprise at least one of a bandwidth and memory buffer condition.

8. A method of encoding a plurality of video frames of a video content into a bit stream, said method comprising:
- encoding a particular video frame using a bit budget based on a plurality of encoding factors comprising an average frame display duration, the average frame display duration comprising a historical average frame display duration, each factor in the plurality of encoding factors assigned a different weight such that adjusting the bit budget occurs disproportionately based on the different weights assigned to each of the encoding factors;
- increasing the bit budget when a bits per pixel per frame quality of the encoded video frame is below a threshold; and
- re-encoding the particular video frame using the increased bit budget.

9. The method of claim 8, wherein said encoding and re-encoding are performed in a real-time encoding application.

10. The method of claim 8, wherein said encoding and re-encoding are performed in an application that does not perform real-time encoding.

11. A method of encoding a plurality of video frames of a video content into an encoded bit stream that satisfies a threshold for decoding said encoded bit stream at a decoding unit, said method comprising:
- identifying a default bit budget for encoding at least one particular video frame of the plurality of video frames into said encoded bit stream;
- optimizing the default bit budget based on a plurality of factors related to the particular video frame, a historical average frame display duration of a plurality of neighboring video frames, and transmission of the bit stream to produce a modified bit budget that satisfies the threshold, each factor in the plurality of factors assigned a different weight such that adjusting the bit budget occurs disproportionately based on the different weights assigned to each of the factors; and
- encoding the particular video frame into the bit stream using the modified bit budget.

12. The method of claim 11, wherein identifying the default bit budget comprises determining the default bit budget from a frame type of the particular video frame.

13. The method of claim 12, wherein identifying the default bit budget further comprises determining the default bit budget based on whether the particular video frame is an intra-frame or inter-frame frame type.

14. The method of claim 11, wherein optimizing the default bit budget further comprises analyzing a plurality of factors related to video frames neighboring the particular video frame.

15. A non-transitory computer readable storage medium storing a computer program for encoding a plurality of video frames of a video content into a bit stream, the computer program for execution by at least one processor, the computer program comprising sets of instructions for:
- determining a default bit budget for a particular video frame of the plurality of video frames;
- adjusting said default bit budget to generate a target bit budget for said video frame based on a plurality of factors comprising an average frame display duration, the average frame display duration comprising a historical average frame display duration, each factor in the plurality of factors assigned a different weight such that adjusting the default bit budget occurs disproportionately based on the different weights assigned to each of the different factors; and
- encoding the particular video frame using the adjusted target bit budget.

16. The non-transitory computer readable storage medium of claim 15, wherein the set of instructions for adjusting the default bit budget to generate the target bit budget comprises a set of instructions for adjusting the default bit budget based on a memory buffer condition of a decoding unit for decoding the encoded digital video content.

17. The non-transitory computer readable storage medium of claim 15, wherein the set of instructions for adjusting the default bit budget to generate the target bit budget comprises a set of instructions for adjusting the default bit budget based on a bandwidth limitation for transmitting the encoded bit stream to a decoding unit for decoding the encoded digital video content.

18. The non-transitory computer readable storage medium of claim 15, wherein the set of instructions for determining the default bit budget comprises a set of instructions for determining the default bit budget based on a selected video image quality level and an averaging of an encoding factor over said plurality of video frames.

* * * * *